US008269975B1

(12) United States Patent
Olczak

(10) Patent No.: US 8,269,975 B1
(45) Date of Patent: Sep. 18, 2012

(54) COMPUTER GENERATED HOLOGRAM SYSTEM FOR WAVEFRONT MEASUREMENT SYSTEM CALIBRATION

(75) Inventor: Eugene Olczak, Pittsford, NY (US)

(73) Assignee: Exelis, Inc., McLean, VA (US)

(*) Notice: Subject to any disclaimer, the term of this patent is extended or adjusted under 35 U.S.C. 154(b) by 438 days.

(21) Appl. No.: 12/186,667

(22) Filed: Aug. 6, 2008

Related U.S. Application Data

(60) Provisional application No. 61/055,326, filed on May 22, 2008.

(51) Int. Cl.
*G01B 9/021* (2006.01)
(52) U.S. Cl. ........................................ 356/457; 356/513
(58) Field of Classification Search .................. 356/457, 356/458, 511–514
See application file for complete search history.

(56) References Cited

U.S. PATENT DOCUMENTS

| 3,917,379 A * | 11/1975 | Noguchi ........................ 359/24 |
| 2005/0275849 A1 * | 12/2005 | Freimann et al. ............. 356/521 |

OTHER PUBLICATIONS

Wyant, J.C. and O'Neill, P.K.; Computer Generated Hologram; Null Lens Test of Aspheric Wavefronts, Applied Optics. vol. 13, 2762, Dec. 1974.
Chunyu Zhao and James H. Burge, "Imaging Aberrations From Null Correctors", Proc. of SPIE, vol. 6723 67230L-1 through 67230L-12, Nov. 2007.

* cited by examiner

*Primary Examiner* — Tarifur Chowdhury
*Assistant Examiner* — Jonathon Cook
(74) *Attorney, Agent, or Firm* — RatnerPrestia

(57) ABSTRACT

A device for calibrating a wavefront measuring system (WMS) includes a computer generated hologram (CGH) disposed in an axial path of light traveling to or from the WMS, and an imaging lens disposed in the axial path between the WMS and the CGH. An entrance port of the WMS is configured to form a pupil image of a device under test, where a center of curvature (CoC) of the device under test is located along the axial path between the pupil image and the device under test. The CGH is located along the axial path at the CoC, when the imaging lens is inserted between the CoC and the WMS.

15 Claims, 7 Drawing Sheets

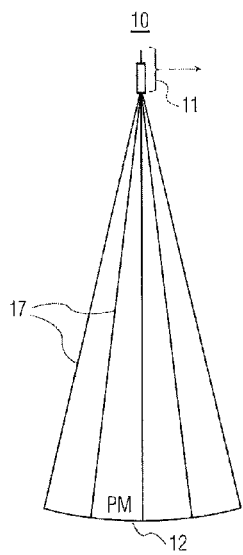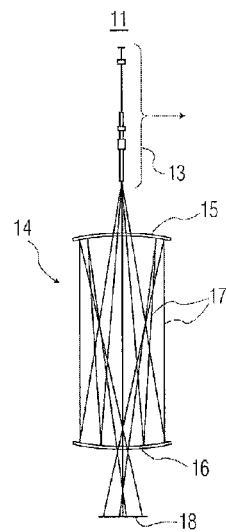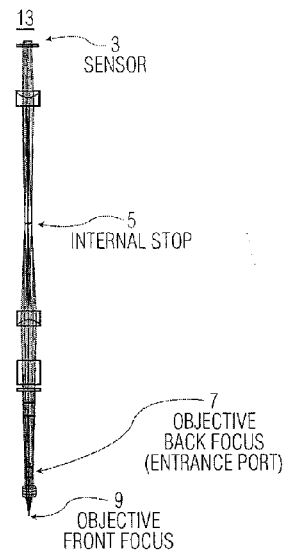
FIG. 1A
PRIOR ART
FIG. 1B
PRIOR ART
FIG. 1C
PRIOR ART

US 8,269,975 B1

COMPUTER GENERATED HOLOGRAM SYSTEM FOR WAVEFRONT MEASUREMENT SYSTEM CALIBRATION

CROSS REFERENCE TO RELATED APPLICATIONS

This application claims priority of U.S. Provisional Patent Application Ser. No. 61/055,326 filed May 22, 2008.

TECHNICAL FIELD

The present invention relates, in general, to the field of optics. More specifically, the present invention relates to systems and methods for calibrating and testing of optical surfaces using computer generated holograms (CGHs).

BACKGROUND OF THE INVENTION

FIG. 1A shows an exemplary optical layout of a test set configuration, generally designated as 10, for testing a primary mirror (PM), for example. The primary mirror 12 is shown as a monolith structure, but may be constructed from multiple mirrors segments that typically require alignment before general use. A test system 11 transmits rays of light 17 toward PM 12. The rays of light 17 are reflected off PM 12 and returned to test system 11 for aligning the mirror segments of PM 12.

The test system 11 may be seen in greater detail in FIG. 1B. As shown, test system 11 includes interferometer optics 13 and nulling device 14. The rays of light 17 are emitted from the optics of the interferometer toward nulling device 14. The light rays first enter spherical imaging mirror 15 through a first aperture (not shown) and then reflect off aspheric mirror 16 back to the spherical imaging mirror. The light rays 17 exit nulling device 14 through a second aperture (not shown) in aspheric mirror 16. FIG. 1B also shows the PM paraxial focus, which is referred to as a center of curvature (CoC) 18 of the PM.

FIG. 1C shows the test system from front focus 9 of the objective lens to interferometer sensor 3. Also shown is back focus 7 of the objective lens, which is the entrance port of the interferometer. It will be appreciated that the image is formed at the interferometer sensor, and the PM is treated as the object. The aperture of the internal relay in the interferometer is shown as internal stop 5 of the system and is also the image conjugate to the front focus of the objective lens, where the image of the internal stop has a diameter of approximately 1.5 mm.

It will be understood that the imaging of the PM, shown in FIGS. 1A-1C, is a single pass. In other words, each surface in the ray trace is impinged only once. When performing interferometry all surfaces, except the PM, are impinged twice. This is because the interferometer transmits the light source toward the PM, and receives the same light reflected back from the PM. In this example, images of the PM may be formed at aspheric mirror 16, objective back focus 7 and sensor 3. These surfaces are, thus, defined as conjugate to the PM, or the pupil conjugate.

Optical surfaces may be calibrated using a computer generated hologram (CGH). For example, the PM surface shown in FIG. 1A may be tested or calibrated using a CGH. Furthermore, the optics in the test system, for example, optics in the interferometer and/or optics in the nulling device may be calibrated using a CGH.

Referring to FIG. 2, ray traces are shown between the objective lens front focus (part of interferometer optics 13 shown in FIG. 1B) and the center of curvature (CoC) 18 of PM 12. The CGH 19 may be placed at or near the CoC. The CGH is, typically, moved into position to intercept the light arriving from the interferometer during calibration; and, typically, is moved out of position, when calibration is completed.

The CGH acts as an inverse null lens. The CGH provides light back to the objective lens' front focus 9 without any wavefront variance, if everything is perfect (at 687 nm wavelength, for example). The CoC is usually located outside the caustic to provide easier wavefront mapping. (The caustic ends at the CoC.) The CGH may be located anywhere between the CoC and the PM, but is typically located close to the CoC to keep the radial size of the CGH to a minimum.

Thus, during an exemplary calibration performed by the inventor, the PM was replaced with the CGH. The CGH was located between the CoC and the PM (5 mm away from the CoC). The image was analyzed at the interferometer entrance port. As a result of the CGH located 5 mm from the CoC, the CGH was not a pupil conjugate of the interferometer pupil. The interferometer pupil, therefore, was not imaged well back on itself.

Results of the calibration is shown in FIG. 3, which provides a plot of the root mean square (RMS) wavefront error (WFE) in waves, at 687 nm, versus a Y-field in mm for the pupil image. The image was taken with a ray trace from the first pass aspheric mirror of the nulling device to the interferometer entrance port. The large WFE is due to a large field curvature at or near the axis. The WFE is lowest, however, at the edge of the pupil image field. Interestingly, the WFE also increases as the CGH location is moved closer to the CoC.

The WFE shown in FIG. 3 is due to a finite conjugate ray trace from the first pass aspheric mirror 16 to the interferometer entrance port 7. Here the aspheric mirror 16 is considered the object to be imaged back to the interferometer entrance port 7, or back focus 7.

This contrasts sharply with the imaging results of the test configuration shown in FIG. 1A, in a single pass ray trace having an axial length of 3300 mm between the interferometer entrance port and the PM under test. The WFE for the test configuration of FIG. 1A is shown in FIG. 4. As shown, the WFE results are well within the diffraction limit of 0.07 RMS WFE. Accordingly, there is a wide discrepancy in imaging test results between the test configuration of FIG. 1A and the calibration configuration of FIG. 2. This discrepancy must be minimized for good calibration fidelity.

The present invention provides a system and method for improving test results, when using a CGH to calibrate a wavefront measuring system (WMS), such as an interferometer and a reflective nulling device. The present invention is described below.

SUMMARY OF THE INVENTION

To meet this and other needs, and in view of its purposes, the present invention provides a device for calibrating a wavefront measuring system (WMS). The WMS typically includes a null lens, which in turn may include any combination of reflective, refractive or diffractive components. The device includes a computer generated hologram (CGH) disposed in an axial path of light traveling to or from the WMS, and an imaging lens disposed in the axial path between the WMS and the CGH. An entrance port of the WMS is configured to form a pupil image of a device under test, where a center of curvature (CoC) of the device under test is located along the axial path between the pupil image and the device under test. The CGH is located along the axial path, at or near the CoC, when the imaging lens is disposed in the axial path between the WMS and the CGH.

The WMS may include an interferometer and a reflective nulling device, where the imaging lens is disposed between the reflective nulling device and the CGH. The WMS may include an objective lens located along the axial path between the interferometer and the reflective nulling device. The reflective nulling device includes an aspheric mirror, and the imaging lens is disposed between the aspheric mirror and the CGH.

The imaging lens is configured to deliver a first bundle of light toward the CGH, when the imaging lens is disposed in the axial path; without the imaging lens in the axial path, a second bundle of light is delivered toward the CGH; and the first bundle of light is smaller than the second bundle of light. The imaging lens includes a plano surface facing away from the CGH and a convex surface facing toward the CGH.

An entrance port of the WMS is configured to form a pupil image of a device under test, and the CGH forms an imaging conjugate of the pupil image. Evenly spaced points on the pupil image at the entrance port of the WMS form corresponding evenly spaced points on the GCH.

The inverse null CGH has a first maximum density of grating rings when the imaging lens is disposed in the axial path. An equivalent inverse null CGH designed to work without the imaging lens includes a second maximum density of grating rings. The first maximum density of grating rings is less than the second maximum density of grating rings.

The CGH includes a first radial size when the imaging lens is disposed in the axial path; and the CGH includes a second radial size without the imaging lens in the axial path; and the first radial size is less than the second radial size.

Another embodiment of the present invention is a calibration system. The calibration system includes a light source, a device under test, and a wavefront measuring system (WMS). The light source is configured to transmit light, along an axial direction, to the device under test; and the WMS is configured to receive light, along the axial direction, which is reflected from the device under test. A computer generated hologram (CGH) is selectively inserted along the axial direction for calibrating the WMS. An imaging lens is inserted along the axial direction for refracting the transmitted light onto the CGH. The light source and the WMS form an interferometer, and the device under test is a surface of a reflecting mirror.

The device under test forms a center of curvature (CoC) along the axial direction. The CGH is disposed near the CoC, when the imaging lens is inserted along the axial direction.

The WMS includes an entrance port for forming a pupil image of the device under test. When the CGH and the imaging lens are both inserted along the axial direction, the CGH forms an image conjugate of the pupil image. When the CGH and the imaging lens are both inserted along the axial direction, the CGH is configured for calibrating at least middle and high spatial frequencies of the WMS.

Yet another embodiment of the present invention includes a method of calibrating a test system including a wavefront measuring system (WMS), a reflective nulling device and a computer generated hologram (CGH). The method includes the steps of: (a) inserting an imaging lens between the reflective nulling device and the CGH; (b) transmitting light from a light source to the CGH by way of the reflective nulling device; and (c) analyzing the light reflected from the CGH by the WMS.

The method may include the step of: (d) aligning the imaging lens to the CGH using an interferometer.

It is understood that the foregoing general description and the following detailed description are exemplary, but are not restrictive, of the invention. For example, the embodiments described herein may be taken as axi-symmetric. One skilled in the art would recognize that an axis may be defined for a non axi-symmetric system, or a system having de-centered components. As another example, reflective or diffractive components (as a lens) may be used as an alternative to refractive components. Such modifications would be within the scope of the present invention.

BRIEF DESCRIPTION OF THE FIGURES

The invention may be understood from the following detailed description when read in connection with the following figures:

FIGS. 1A, 1B and 1C depict a test system for testing a surface of a primary mirror in a conventional manner.

DETAILED DESCRIPTION OF THE INVENTION

Degradation in the visibility of sinusoidal phase patterns may be predicted using a method based on Talbot imaging, which derives a transfer function (TF). For a phase variation of period d, TF is the observed amplitude W' divided by the actual amplitude W, as follows:

$$TF = \frac{W'}{W} = \cos\left(\frac{\Pi \lambda Z}{d^2}\right)$$

where:
Z is the distance from best focus,
d is the period of the phase variation, and
$\lambda$ is the wavelength.

A transfer function (TF) value of 1 indicates perfect data fidelity; a transfer function value of 0 indicates no data transmittal; and a transfer function value of −1 indicates data transmitted with a 180 degree error in polarity.

Figure 5A:
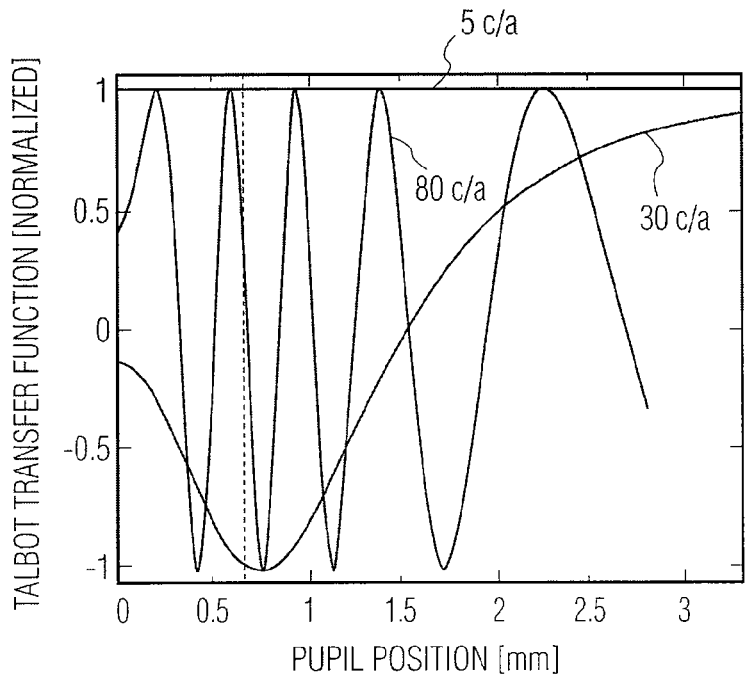
FIGS. 5A and 5B are plots of a Talbot transfer function versus pupil position in millimeters at various spatial frequencies.
Figure 5B:
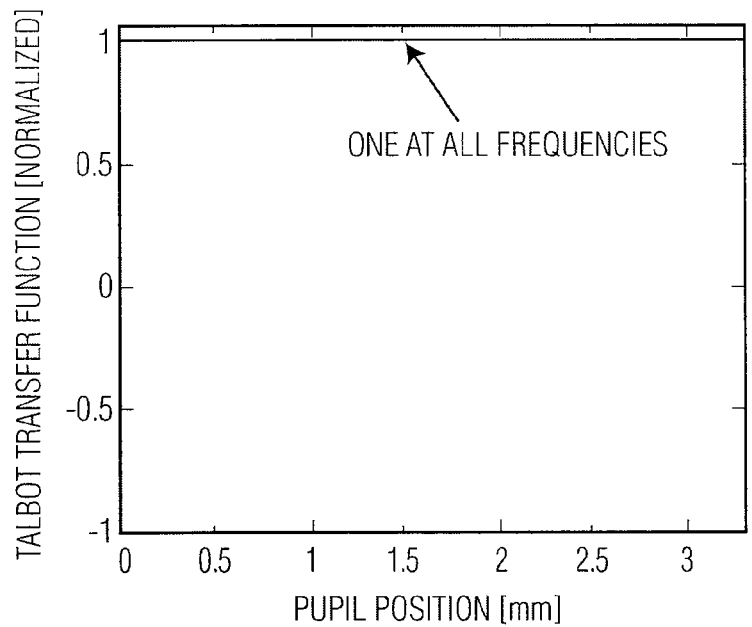

FIGS. 5A and 5B show the TF effects predicted for a first pass optical path and a second pass optical path, respectively. Here, the object field is defined as points on an outbound entrance port plane (from the interferometer) and the image surface is defined on an inbound entrance port plane (to the interferometer). Focus is maintained on the second pass.

Figure 2:
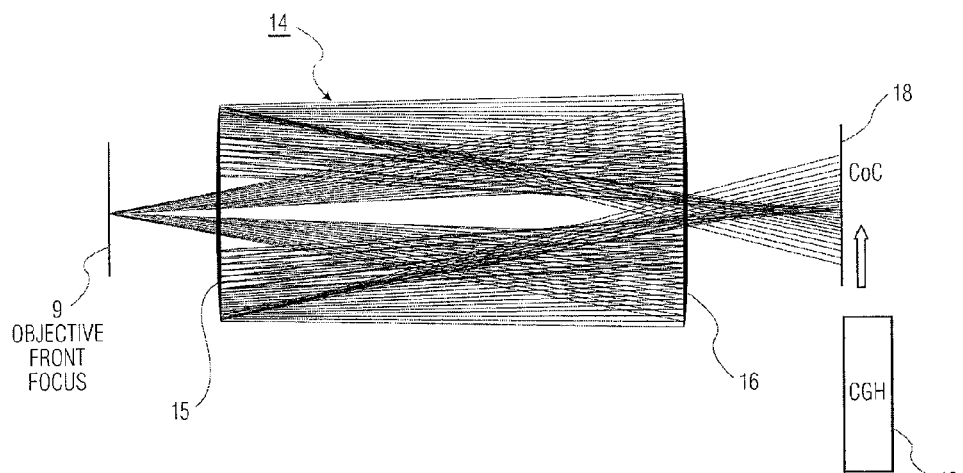
FIG. 2 is an example of a reflective nulling device, which may be used in the optical path for testing the primary mirror of FIGS. 1A, 1B and 1C.
Figure 3:
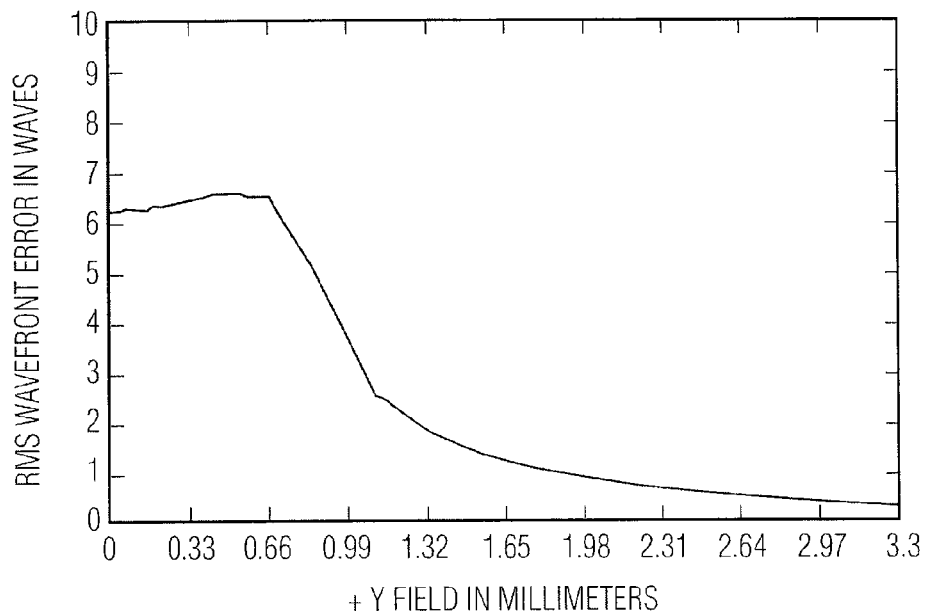
FIG. 3 is a plot of RMS wavefront error versus a Y-field in millimeters, showing performance of the test system of FIGS. 1 and 2 with a first pass aspheric image at the objective lens of the interferometer.
Figure 4:
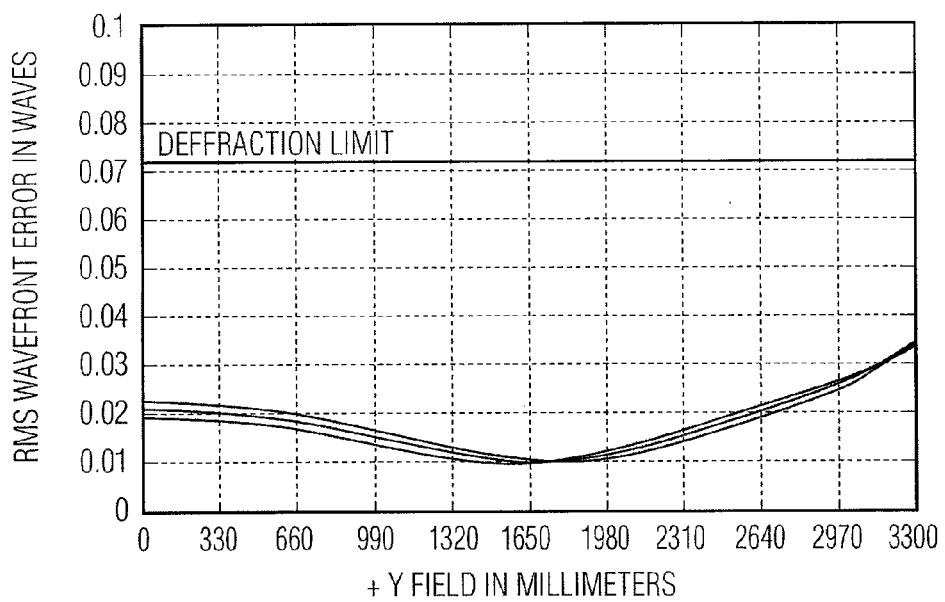
FIG. 4 is a plot of RMS wavefront error versus a Y-field in millimeters, depicting a single pass imaging performance at the interferometer entrance port.

FIG. 5A shows the pupil imaging phase transfer function with the CGH located 5 mm from the CoC, where the object surface is at the first pass of the aspheric mirror (FIG. 2). FIG. 5B shows the pupil imaging phase transfer function with the CGH located 5 mm from the CoC, where the object surface is at the second pass of the aspheric mirror.

Both, FIG. 5A and FIG. 5B, plot the sagittal image phase transfer function versus pupil field in radial pupil coordinates. Three periods are plotted and annotated in terms of cycles over a PM image aperture (c/a). The first period is 5 c/a, which is considered the transition between low and middle spatial frequencies; the second period is 30 c/a, which is considered the transition between middle and high spatial frequencies; and the third period is 80 c/a, which is considered the highest spatial frequency.

FIG. 5A shows the first pass TF and FIG. 5B shows the second pass TF. The results of the transfer function plots in FIG. 5A are good at low spatial frequencies but poor at the middle and high spatial frequencies. The second pass TF is essentially unity at all frequencies and fields. Unity (1) is a desired value. It will be appreciated that for double pass calibration, the total measured phase error due to the null asphere is the sum of the transfer functions for the first and second passes for all fields and frequencies.

The inventor has, thus, discovered that the double pass test configuration is not capable of calibrating the middle and high spatial frequencies in the nulling device. The CGH placed near the CoC creates a poorly focused pupil image for the first pass through the nulling device, such that the middle and high spatial frequency errors may be under reported, or cancelled by the contribution in the second pass. The reason for this short coming may be due to the CGH not being placed at an image conjugate of the entrance port of a WMS (for example, an interferometer).

By adding an imaging lens in the optical path between a WMS and a CGH, the imaging properties during calibration of the WMS optics may be made comparable to the imaging properties found in the WMS optics used in a test configuration. With the addition of the imaging lens, calibration of middle and high spatial frequency errors in the WMS optics may be achieved.

Figure 6:
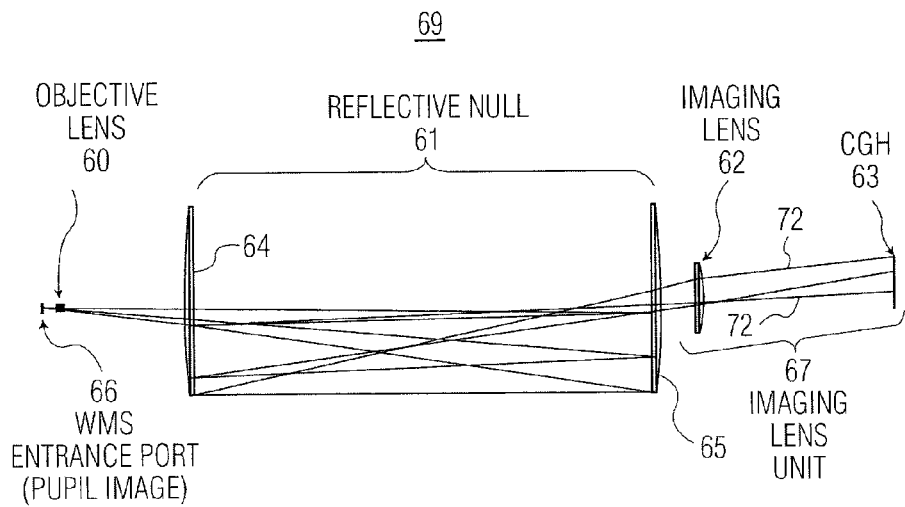
FIG. 6 is an optical trace between a computer generated hologram (CGH) and the entrance port of a wavefront measuring system (WMS), in accordance with an embodiment of the present invention.

Referring now to FIG. 6, there is shown an example of WMS optics, which are to be calibrated in accordance with an embodiment of the present invention. As shown, the WMS image of an optical surface under test (for example, a PM surface) is located at the WMS entrance port (or pupil image) on the left side of the figure. The WMS entrance port is designated as 66. The WMS optics includes objective lens 60 and reflective nulling device 61. Reflecting mirror 64 is located on the side of the nulling device that is closer to the WMS entrance port. The aspheric mirror 65 is located on the side of the nulling device that is closer to imaging lens 62. To the right of reflective nulling device 61 is imaging lens 62 and CGH 63. The CGH and the imaging lens may be considered as an integral imaging lens unit 67. Light paths from three image positions from the WMS entrance port to the CGH are shown in the figure.

Figure 7:
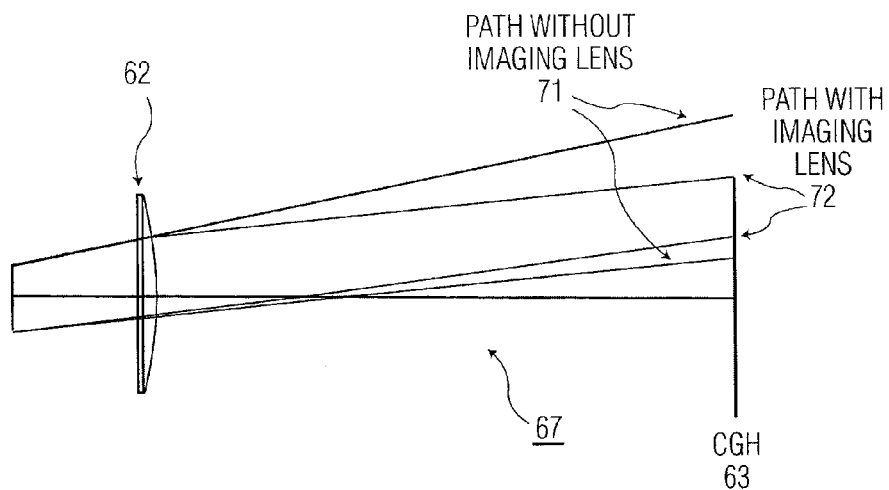
FIG. 7 shows a portion of the optical trace shown in FIG. 6, between an imaging lens and the CGH.

Referring next to a portion of calibration system 69, as shown in FIG. 7, light paths 72 are shown impinging upon (or reflecting from) CGH 63. The radial size of the pupil image on CGH 63, due to the refractive properties of imaging lens 62, is smaller than the radial size on CGH 63 without imaging lens 62 in the light path. The light path without imaging lens 62 is designated as 71. The smaller bundle of light path 72, as compared to the bundle of light path 71, is due to the improved imaging by imaging lens 62 onto CGH 63.

The imaging lens 62, shown in FIGS. 6 and 7, as an example, is a plano-convex lens and has a 300 mm effective focal length (EFL). The imaging lens 62 is positioned axially at 65 mm away from the vertex of aspheric mirror 65.

In the set up of calibration system 69, the CGH location is at the CoC of a segmented primary mirror (PM) assembly under test. For this calibration system, if the imaging lens is not used, then the uniformly spaced pupil image points are not very uniformly spaced at the CGH. With the imaging lens inserted in the calibration system, however, the pupil image points are uniform at the CGH. This improvement in uniformity substantially reduces the asphericity of the wavefront that the CGH is typically required to produce (2.9× reduction, for example).

Another advantage of inserting the imaging lens is that it helps during the calibration of the CGH write process errors. Often a reference spherical wavefront is encoded onto a CGH and used to predict distortions in the CGH write process, using a separate WMS to test the reference spherical wavefront. This separate test is, typically, linear when mapping to the CGH surface (for radial position). To be useful, the data taken with the separate WMS must be remapped to the primary WMS for the test calibration. With the imaging lens, the linearity of the CGH phase encoding is even better, resulting in a reduced mapping error source.

From a software/modeling point of view, the present invention is also advantageous. The asphericity of the CGH wavefront without the imaging lens is large and less than 100 even-order radial polynomials (a standard description used in most optical ray trace software) cannot adequately capture it. By contrast, the wavefront (phase) for the CGH with the imaging lens may be created using a Zemax Software Binary 2 surface with a grating described by even-order radial polynomials of order 60. The design residual for calibration system 69 is 0.5 nanometers root mean square (RMS) equivalent test surface.

Another benefit of using the imaging lens is achieving a reduction in the diameter size of the pupil image on the CGH. The pupil image on the CGH may be reduced by 33% in the example shown in FIGS. 6 and 7.

Figure 8:
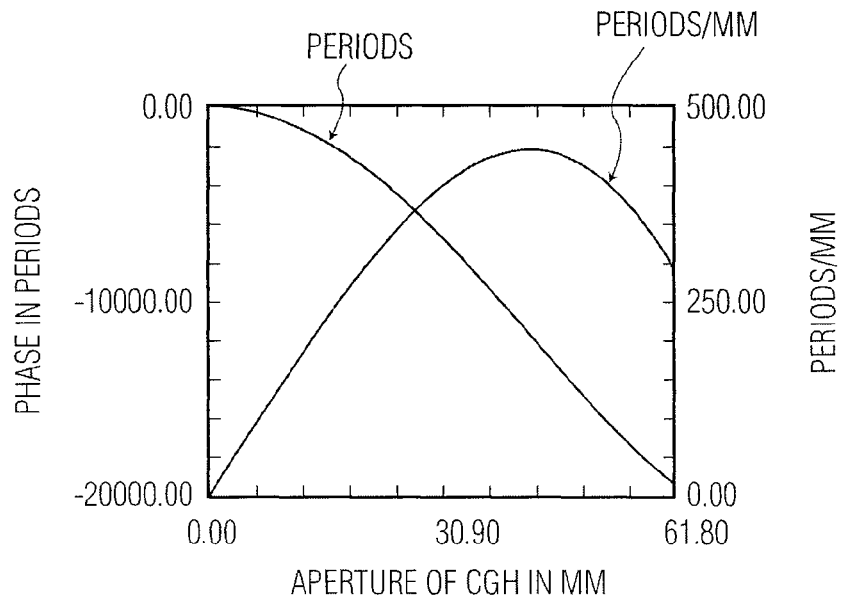
FIG. 8 is a plot of phase in periods versus the aperture size of the CGH in millimeters.

Still another benefit of the present invention, which may not be apparent from FIG. 7, is the reduced density of the grating rings required for the CGH when the imaging lens is inserted. Without the imaging lens, a maximum density of 657 lines per millimeter is required (687 nm test wavelength). This density is near the manufacturing limit for current technology. By using the imaging lens, however, the maximum grating ring density is reduced to 443 lines per millimeter, as shown in FIG. 8. This benefit is unexpected, due to the size of the CGH resulting in a smaller diameter.

Figure 9:
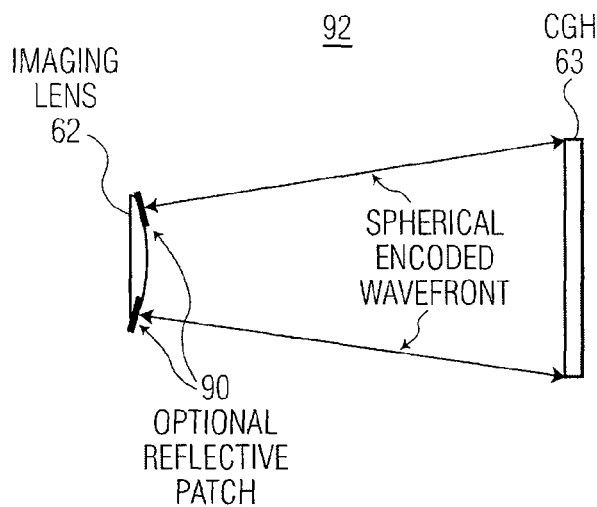
FIG. 9 is a system for aligning the optical path between an imaging lens and a CGH, in accordance with an embodiment of the present invention.

In order to use the CGH effectively, the imaging lens is precisely located with respect to the CGH. An example of an optical alignment system, designated as 92, between an imaging lens and a CGH is shown in FIG. 9. If the imaging lens has a plano surface facing away from the CGH, then an autocollimator or interferometer may be used to precisely set the tilt of the plano surface with respect to the CGH. The setting of the tilt may be accomplished by observing both the imaging lens and the CGH simultaneously (from the left side of the figure). If a spherical wavefront is encoded in the CGH surface (for example, in the outer radial or azimuthal zones), such that the wavefront impinging the curved surface of the imaging lens is normal (by design), then de-centering and de-spacing of the imaging lens relative to the CGH may be set using an interferometer located to the right side of the figure (by observing fringe tilts and power).

The spherical encoded wavefront may be a completely separate feature from the CGH calibration features described above (or may be the same grating in a different diffraction order). Reflective patches on the imaging lens may boost the reflected signal, if needed. The surface quality, thickness and index of refraction of the imaging lens may be determined prior to assembly by any standard method. Ideally, the imaging lens and CGH are in a common mount that allows for precise shear and rotation of the CGH with respect to the WMS optical axis, so that the CGH and WMS errors may be separated using multi orientation testing.

The following is an example of prescription data for calibration system 69, including imaging lens 62, shown in FIG. 6:

TABLE

System/Prescription Data
File: I:\CGH\CGH_imagconj\imageonCGH_687v4.zmx
Title: JWST Reflective Asphere Null Version I Revision 24
Date: MON APR. 28, 2008

SURFACE DATA SUMMARY:

| Surf | Type | Radius | Thickness | Glass | Diameter | Conic |
|---|---|---|---|---|---|---|
| OBJ | STANDARD | Infinity | 180 | | 0 | 0 |
| 1 | STANDARD | Infinity | 737.2605 | | 56.7839 | 0 |
| STO | EVENASPH | −4190.094 | 0 | MIRROR | 288 | 369.7622 |
| 3 | STANDARD | Infinity | −737.2605 | | 288.1178 | 0 |
| 4 | STANDARD | 1400 | 0 | MIRROR | 268.22 | 0 |
| 5 | STANDARD | Infinity | 737.2605 | | 270.9039 | 0 |
| 6 | STANDARD | Infinity | 65 | | 36.43721 | 0 |
| 7 | STANDARD | Infinity | 10.7 | N-BK7 | 100 | 0 linos |
| 8 | STANDARD | −156.22 | 297.9218 | | 100 | 0 312391 |
| 9 | BINARY_2 | Infinity | −297.9218 | MIRROR | 123.6016 | 0 |
| 10 | STANDARD | −156.22 | −10.7 | N-BK7 | 100 | 0 |
| 11 | STANDARD | Infinity | −65 | | 100 | 0 |
| 12 | EVENASPH | −4190.094 | −737.2605 | | 36.48265 | 369.7622 |
| 13 | STANDARD | 1400 | 0 | MIRROR | 268.161 | 0 |
| 14 | STANDARD | Infinity | 737.2605 | | 267.9852 | 0 |
| 15 | EVENASPH | −4190.094 | 0 | MIRROR | 288.0045 | 369.7622 |
| 16 | STANDARD | Infinity | −737.2605 | | 289.3689 | 0 |
| 17 | STANDARD | Infinity | −180 | | 56.84543 | 0 |
| IMA | STANDARD | Infinity | | | 0.07550677 | 0 |

SURFACE DATA DETAIL:

Surface OBJ: STANDARD
Surface 1: STANDARD
Surface STO: EVENASPH
Mirror Substrate: Curved, Thickness = 5.76000E+000
Coeff on r 2: 0
Coeff on r 4: −3.8250554e−009
Coeff on r 6: 1.713067e−014
Coeff on r 8: −8.4078707e−020
Coeff on r 10: 4.9251331e−025
Coeff on r 12: 1.6236729e−028
Coeff on r 14: −4.4465624e−033
Coeff on r 16: 7.8028573e−038
Aperture: Circular Aperture
Minimum Radius: 21
Maximum Radius: 155.957
Surface 3: STANDARD
Surface 4: STANDARD
Mirror Substrate: Curved, Thickness = 5.36440E+000
Surface 5: STANDARD
Surface 6: STANDARD
Surface 7: STANDARD linos
Aperture: Floating Aperture
Maximum Radius: 50
Surface 8: STANDARD 312391
Aperture: Floating Aperture
Maximum Radius: 50
Surface 9: BINARY_2
Mirror Substrate: Curved, Thickness = 2.47203E+000
Diffract Order: 1
Coeff on r 2: 0
Coeff on r 4: 0
Coeff on r 6: 0
Coeff on r 8: 0
Coeff on r 10: 0
Coeff on r 12: 0
Coeff on r 14: 0
Coeff on r 16: 0

TABLE-continued

System/Prescription Data
File: I:\CGH\CGH_imagconj\imageonCGH_687v4.zmx
Title: JWST Reflective Asphere Null Version I Revision 24
Date: MON APR. 28, 2008

Figure 10A:
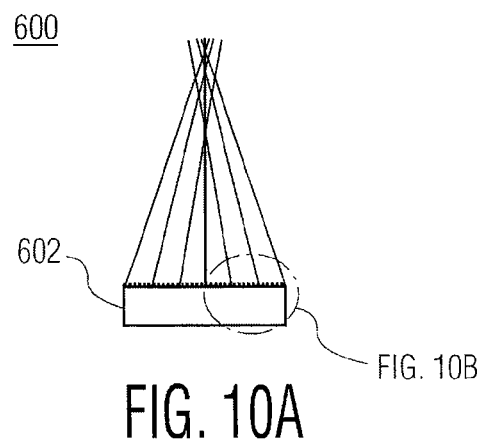
FIGS. 10A, 10B and 10C are examples of a computer generated hologram (CGH), in accordance with an embodiment of the present invention.
Figure 10B:
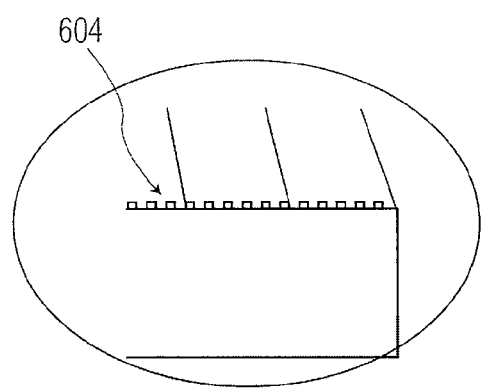
Figure 10C:
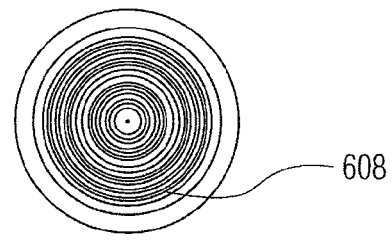

Maximum term: 32
Maximum rad ap: 55.2
Term on P to 2: −152226.52
Term on P to 4: 54362.083
Term on P to 6: −45404.087
Term on P to 8: 156152.83
Term on P to 10: −481894.76
Term on P to 12: 1084418.5
Term on P to 14: −1566416.1
Term on P to 16: 1297720.8
Term on P to 18: −376751.26
Term on P to 20: −385373.69
Term on P to 22: 527410.08
Term on P to 24: −143833.67
Term on P to 26: −180419.24
Term on P to 28: −190704.37
Term on P to 30: 542532.05
Term on P to 32: −131504.68
Term on P to 34: −98270.237
Term on P to 36: −79592.849
Term on P to 38: −60229.472
Term on P to 40: 106946.61
Term on P to 42: 72352.82
Term on P to 44: 39404.435
Term on P to 46: −164751.45
Term on P to 48: 80815.816
Term on P to 50: −29905.604
Term on P to 52: 12507.601
Term on P to 54: 13773.691
Term on P to 56: −5390.7126
Term on P to 58: −6177.561
Term on P to 60: 2644.5111
Term on P to 62: 0
Term on P to 64: 0
Surface 10: STANDARD
Aperture: Floating Aperture
Maximum Radius: 50
Surface 11: STANDARD
Aperture: Floating Aperture
Maximum Radius: 50
Surface 12: EVENASPH
Coeff on r 2: 0
Coeff on r 4: −3.8250554e−009
Coeff on r 6: 1.713067e−014
Coeff on r 8: −8.4078707e−020
Coeff on r 10: 4.9251331e−025
Coeff on r 12: 1.6236729e−028
Coeff on r 14: −4.4465624e−033
Coeff on r 16: 7.8028573e−038
Surface 13: STANDARD
Mirror Substrate: Curved, Thickness = 5.36322E+000
Surface 14: STANDARD
Surface 15: EVENASPH
Mirror Substrate: Curved, Thickness = 5.76009E+000
Coeff on r 2: 0
Coeff on r 4: −3.8250554e−009
Coeff on r 6: 1.713067e−014
Coeff on r 8: −8.4078707e−020
Coeff on r 10: 4.9251331e−025
Coeff on r 12: 1.6236729e−028
Coeff on r 14: −4.4465624e−033
Coeff on r 16: 7.8028573e−038
Surface 16: STANDARD
Surface 17: STANDARD
Surface IMA: STANDARD An exemplary CGH is shown in FIGS. 10A, 10B and 10C. Hologram 600 includes flat glass substrate 602 with concentric rings 604 of chrome formed thereon. As shown in FIG. 10C, a portion of hologram 600 includes ring patterns 608 for a wavelength associated with interferometer 13. In an exemplary embodiment, ring patterns 608 correspond to the plot in FIG. 8.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A device for calibrating a wavefront measuring system (WMS) comprising
a WMS for transmitting and receiving an optical wavefront,
a computer generated hologram (CGH) disposed in an axial path of light traveling to or from the WMS, the CGH including grating rings having a predetermined density,
an imaging lens disposed in the axial path between the WMS and the CGH,
the optical wavefront transmitted from the WMS, through the imaging lens, toward the CGH,
the optical wavefront returned from the CGH, through the imaging lens, and received by the WMS, and
the imaging lens forms a less aspheric optical wavefront when disposed in the axial path, than an optical wavefront formed when the imaging lens is not disposed in the axial path,
an entrance port of the WMS is configured to form a pupil image of a device under test,
a center of curvature (CoC) of the device under test is located along the axial path between the pupil image and the device under test, and
the CGH is located along the axial path, adjacent the CoC, when the imaging lens is disposed in the axial path between the WMS and the CGH.

2. The device of claim 1 wherein
the WMS includes an interferometer and a reflective nulling device, and
the imaging lens is disposed between the reflective nulling device and the CGH.

3. The device of claim 2 wherein
the WMS includes an objective lens located along the axial path between the interferometer and the reflective nulling device.

4. The device of claim 2 wherein
the reflective nulling device includes an aspheric mirror, and
the imaging lens is disposed between the aspheric mirror and the CGH.

5. The device of claim 1 wherein
the imaging lens is configured to deliver a first bundle of light toward the CGH, when the imaging lens is disposed in the axial path,
when the imaging lens is not in the axial path, a second bundle of light is delivered toward the CGH, and
the first bundle of light is smaller than the second bundle of light.

6. The device of claim 1 wherein
the imaging lens includes a plano surface facing away from the CGH and a convex surface facing toward the CGH.

7. The device of claim 1 wherein
an entrance port of the WMS is configured to form a pupil image of a device under test, and
the CGH forms an image conjugate of the pupil image.

8. The device of claim 7 wherein
the device under test includes a surface of a segmented primary mirror (PM).

9. The device of claim 7 wherein
evenly spaced points on the pupil image at the entrance port of the WMS form corresponding evenly spaced points on the GCH.

10. The device of claim 1 wherein
the grating rings of the CGH includes a first density when the imaging lens is disposed in the axial path and a second density when the imaging lens is not disposed in the axial path, and
the first density is less than the second density.

11. A calibration system comprising
a light source,
a device under test, and
a wavefront measuring system (WMS),
the WMS including an entrance port for forming a pupil image of the device under test,
the light source transmits light, along an axial direction, to the device under test, and the WMS receives light, along the axial direction, that is reflected from the device under test,
a computer generated hologram (CGH) is selectively inserted along the axial direction for calibrating the WMS, the CGH including grating rings of a predetermined density,
an imaging lens inserted along the axial direction for passing the transmitted light onto the CGH, and passing reflected light from the CGH to the WMS,
an image conjugate of the pupil image is formed at the CGH,
the device under test forms a center of curvature (CoC) along the axial direction, and
the CGH is disposed near the CoC.

12. The calibration system of claim 11 wherein
the light source and the WMS form an interferometer, and
the device under test is a surface of a reflecting mirror.

13. The calibration system of claim 11 including
a reflective nulling device disposed along the axial direction,
wherein the imaging lens is disposed between the reflective nulling device and the CGH.

14. The calibration system of claim 11 wherein
when the CGH and the imaging lens are both inserted along the axial direction, the CGH is configured for calibrating at least middle and high spatial frequencies of the WMS.

15. A method of calibrating a wavefront measuring system (WMS), a reflective nulling device and a computer generated hologram (CGH), the method comprising the steps of:
inserting an imaging lens between the reflective nulling device and the CGH, the CGH including grating rings for forming an optical wavefront,
transmitting a light from a light source to the CGH by way of the reflective nulling device and through the imaging lens,
reflecting the light from the CGH and again through the reflective nulling device and the imaging lens
analyzing, by the WMS, the wavefront reflected from the CGH,
aligning the imaging lens to the CGH, and
forming an image conjugate of a pupil image of the WMS at the CGH.

* * * * *